United States Patent [19]

Zhao et al.

[11] Patent Number: 5,938,828
[45] Date of Patent: Aug. 17, 1999

[54] SOLID COMPLEXES OF ANIONIC ORGANIC DYES AND QUATERNARY AMMONIUM COMPOUNDS AND METHODS OF COLORING UTILIZING SUCH COMPLEXES

[75] Inventors: Xiaodong Edward Zhao, Moore, S.C.; Kaye Cannon Suddeth, Lynn, N.C.; Robert L. Mahaffey, Jr., Spartanburg, S.C.

[73] Assignee: Milliken & Company, Spartanburg, S.C.

[21] Appl. No.: 09/065,620

[22] Filed: Apr. 24, 1998

[51] Int. Cl.$^6$ .......................... C09D 11/00; C09B 67/54
[52] U.S. Cl. ........................ 106/31.43; 106/31.64; 106/272; 8/606; 8/557; 524/583; 524/585; 524/590; 524/601
[58] Field of Search .................... 510/324, 325, 510/287, 307, 516, 181, 205; 442/130; 8/648, 547, 543, 524, 606, 557; 106/37.15, 18.29, 31.43, 31.64, 272; 524/583, 585, 590, 601

[56] References Cited

U.S. PATENT DOCUMENTS

| | | | |
|---|---|---|---|
| 4,369,041 | 1/1983 | Dvorsky et al. | 8/532 |
| 4,459,130 | 7/1984 | Helling et al. | 8/554 |
| 4,507,407 | 3/1985 | Kluger et al. | 521/113 |
| 4,563,190 | 1/1986 | Töpfl | 8/524 |
| 4,640,690 | 2/1987 | Baumgartner et al. | 8/506 |
| 4,648,883 | 3/1987 | Podder | 8/527 |
| 4,702,744 | 10/1987 | Wolff et al. | 8/527 |
| 5,059,244 | 10/1991 | King et al. | 106/21 |
| 5,096,458 | 3/1992 | Michna et al. | . |
| 5,096,781 | 3/1992 | Vieira et al. | . |
| 5,250,107 | 10/1993 | Bares | 106/20 R |
| 5,266,077 | 11/1993 | Auten et al. | 8/507 |
| 5,356,441 | 10/1994 | Tokieda et al. | 8/543 |
| 5,403,358 | 4/1995 | Aston et al. | 8/445 |
| 5,534,192 | 7/1996 | Incorvia et al. | . |
| 5,624,484 | 4/1997 | Takahashi et al. | . |
| 5,835,116 | 11/1998 | Sato et al. | . |

Primary Examiner—Deborah Jones
Assistant Examiner—Jason Savage
Attorney, Agent, or Firm—Terry T. Moyer; William S. Parks

[57] ABSTRACT

This invention relates to solid complexes of anionic organic dyes with quaternary ammonium compounds which have average molecular weights of below about 900 which are substantially free from unwanted salts. Of particular interest as quaternary ammonium compounds are those which comprise alkoxylated moieties. Such complexes are formed through ionic bonds formed between the two compounds. The complexes are then removed of substantially all resultant unwanted salt formed from the cations of the dye and the counter-ions of the quat so as to obtain a solid dyeing agent which easily disperses within different media and which possess extremely good non-migration and coloring characteristics. This invention also concerns methods of making the aforementioned salt-free solid anionic dye/quat complexes as well as methods of utilizing such complexes for dyeing thermoplastic, thermoset, and wax compositions.

18 Claims, No Drawings

5,938,828

SOLID COMPLEXES OF ANIONIC ORGANIC DYES AND QUATERNARY AMMONIUM COMPOUNDS AND METHODS OF COLORING UTILIZING SUCH COMPLEXES

FIELD OF THE INVENTION

This invention relates to solid complexes of anionic organic dyes with quaternary ammonium compounds which are have average molecular weights of below about 900 which are substantially free from unwanted salts. Of particular interest as quaternary ammonium compounds are those which comprise alkoxylated moieties. Such complexes are formed through ionic bonds formed between the two compounds. The complexes are then removed of substantially all resultant unwanted salt formed from the cations of the dye and the counter-ions of the quat so as to obtain a solid dyeing agent which easily disperses within different media and which possess extremely good non-migration and coloring characteristics. This invention also concerns methods of making the aforementioned salt-free solid anionic dye/quat complexes as well as methods of utilizing such complexes for dyeing thermoplastic, thermoset, and wax compositions.

BACKGROUND OF THE PRIOR ART

All of the patents cited throughout this specification are hereby entirely incorporated herein.

Quaternary ammonium compounds are well known as complexing agents for anionic dyes. For example, U.S. Pat. No. 5,059,244, to King, discloses an aqueous solution of anionic dyes and an ethoxylated triethanolamine. This composition is useful as an ingredient within ink formulations and as an agent for temporarily tinting textile fibers; however patentee neither teaches nor fairly suggests removing any excess inorganic salts. Quaternary ammonium compounds have been disclosed as useful auxiliary agents for printing on fiber materials. For example, U.S. Pat. No. 3,785,767, to Hildebrand, discloses a pad-steaming process for the continuous dyeing and printing of fiber material with a formulation containing anionic dyes and amine salts. Other pertinent teachings of include U.S. Pat. No. 4,563,190, to Topfl, which discloses a dyeing assistant formulation for anionic dyes containing quaternary ammonium compounds that contain at least one basic nitrogen atom to which are attached at least one polyglycol ether chain; U.S. Pat. No. 4,935,033, to Mosimann et al., which discloses a dyeing method for natural polyamide fibers using reactive dyes and a dyeing assistant agent containing a quaternary ammonium compound; and U.S. Pat. No. 4,369,041, to Dvorsky et al., discloses a technique for printing textiles involving exposing the textile to the action of quaternary ammonium compounds before or during the dyeing or printing with acid dyes. Furthermore, Aston et al., U.S. Pat. No. 5,403,358, discloses a pretreatment composition for ink jet which comprises a quaternary ammonium compound and a reactive dye. Such anionic dyes and quaternary ammonium compounds also find application in other areas, for instance: U.S. Pat. No. 4,459130, to Helling et al., discloses a dye preparation which is consisted of an acid dye and a basic carrier which contains quaternary ammonium or phosphonium groups; and U.S. Pat. No. 5,266,077, to Auten et al., discloses a method for tinting a hydrophilic contact lens through the action of a quaternary ammonium compound as a dye complexing agent.

Anionic dyes, in particular acid dyes (i.e., those containing sulfonic or carboxylic acid moieties) provide desirable and beneficial coloring characteristics to many different types of substrates. However, it has proven very difficult to incorporate such beneficial dyes, with acceptable coloring performance, within certain media, such as waxes, polyolefins, polyurethanes, hydrocarbons, and the like. The polarity (hydrophilicity) of such acid dyes is sufficiently high so as to prevent long-lasting dyeing or even any coloring at all within such media. Attempts have been made to utilize more hydrophobic solvent dyes (and other less polar dyes having no acid groups) as colorants for thermoplastics, and the like; however, such a procedure has also proven too disadvantageous since solvent dyes can easily migrate within and out of the aforementioned desired media. There exists a need then to produce an acid dye which possesses the requisite degree of hydrophilicity effectively to bond with and remain within media such as polyolefins, and the like (as noted above).

It has been found that the complexation of an anionic dye with a quaternary ammonium compound and the subsequent removal of substantially all the excess unwanted salts formed during such a reaction produces a solid colorant complex which possesses the highly desired and necessary properties as delineated previously. It has been found that substantially salt-free anionic dye/quaternary ammonium colorant complexes, provide a colorant with a high coloring capacity within many different media with a very low potential for extraction. When placed in a complexing solution, the anionic dye and the quaternary ammonium show a great affinity for one another such that upon disassociation with their respective cations and/or counter ions, the complexation of the dye and quat drives the formation of the unwanted salts comprised of the free cations and counter ions. Once these unwanted salts are formed, they are easy to remove through filtration or extraction techniques. Such a salt removal ensures the dye and quat will remain in a complex together rather than potentially reacting with unwanted free cations and/or counter ions upon disassociation within the dye solution. Thus, the desired properties are obtained with a greater amount of the dye/quat complex and a much lower amount of unwanted residual salt.

Although a great deal of interest has been demonstrated within the area of anionic organic dyes and/or quaternary ammonium compounds as coloring or treating agents for myriad substrates, there is no disclosure of a substantially salt-free solid complex of the two compounds which provides extremely good non-migration within certain media as well as excellent coloring characteristics, and the like, wherein the quaternary ammonium compound has an average molecular weight of below about 900. The closest art, U.S. Pat. No. 4,468,883, to Podder, which teaches anionic dye/polystyrene ion exchange/possible quat colorant particles, discloses quaternary ammonium compounds having, at the absolute lowest level, average molecular weight of 1,000, with patentee's preferred quats having average molecular weights of 10,000 or above. There is thus a great need within the dye and/or colorant art for such types of improvements associated with relatively inexpensive materials and processes as provided by the inventive colorant complexes.

Basically, then, the simplest manner of practicing the invention is first determine the desired anionic dye for its shade, lightfastness, thermal stability, and the like, for the subject substrate to be colored; second, select the appropriate quaternary ammonium compound, with a molecular weight of below about 900, for the subject substrate based on the necessarily required physical properties such as migration, uniform dispersion, solubility, washfastness, and the like; third, react the two compounds together to form a solid colorant; and last, remove the unwanted salts formed from the cation of the dye and the counter-ion of the quat.

OBJECTS OF THE INVENTION

It is therefore an object of this invention to provide a substantially salt-free solid complex of anionic dyes and quaternary ammonium compounds, wherein the quaternary ammonium compound has an average molecular weight of at most 900 grams, as colorants for different substrates and media. A further objective of this invention is to provide a polymeric colorant which can be used in dyeing hydrocarbons, thermoplastics, thermosets, and waxes, as well as within ink-jet and printing ink formulations and applications.

SUMMARY OF THE INVENTION

The technique of forming complexes between anionic dyes and quaternary ammonium compounds is known within the prior art. However, solid salt-free purified anionic dye/quat colorant complexes, wherein the quat has a low average molecular weight, and, more importantly, the advantages and applications of such salt-free complexes have heretofore been unexplored. The term "solid" is intended to mean particulate and wax forms of the inventive complex, in particular those forms which are solid at ambient temperature and pressure (i.e., 25° C. and 1 atmosphere). The inventive colorant complexes are those which produce color in the visible spectrum and comprise quaternary ammonium compounds having average molecular weights of at most 900; preferably at most 500; more preferably at most 450; and most preferably at most 300. The shorter the alkyl, etc., chains on the quaternary ammonium compound, the easier it is to produce a solid complex with the anionic dye. Therefore, quats as small as tetra($C_2$–$C_6$ alkyl) quats are within the scope of this invention. Specifically preferred quats include dicoco dimethyl ammonium chloride (sold under the trade name Adogen® 462).

The inventive colorant complexes are those which produce colors within the visible spectrum and thus specifically do not include whitening agents, optical brighteners, ultra violet absorbers, and the like. The previously taught anionic dyes/quaternary ammonium compound complexes are typically not purified and may contain relatively large amounts (generally from about 1 to about 50%) of unwanted cation/counter-ion salts. Such salts may be strictly inorganic in nature or may comprise organic cations or organic counter-ions as well. Some salts are typically present within acid dye compositions as byproducts from manufacturing processes as well as diluents which provide the capability to level the color strength. Typical inorganic salts are sodium sulfate and sodium chloride, however many other different salts, including organic salts, as noted above, may also be present. As discussed in greater detail below, such unwanted salts are also byproducts from the complexation between anionic dyes and quaternary ammonium compounds. With the presence of such unwanted salts in the composition, either the quaternary ammonium compounds or the inorganic cations may serve as counter ions for the complexed anionic dyes. As a result, the chances for continued complexation between the dye and quat components decreases with the presence of increased amounts of inorganic salts. Since the dye and quat compounds will disassociate in solution, some free acid dye will inevitably bond to free cations and some free quat will inevitably bond with free counter ions, thereby lowering the overall coloring and non-migratory effect of the dye/quat complex. This deleterious effect is thus more pronounced upon greater amounts of residual unwanted salt. Thus, salt-containing acid dye/quat complex colorant systems show uneven solubility and poor dispersability in different organic media, such as plastics, waxes, coating systems, and organic solvents. Such complexes are therefore neither suitable as dyes or colorants for thermoplastics, thermosets, or waxes, nor as colorants within ink-jet and printing applications and formulations. Therefore, the term "substantially salt-free" as used in the context of this invention is intended to mean a complex which is substantially free from these unwanted cation/counter-ion salts.

It has been discovered that a substantially salt-free solid anionic organic dye/quaternary ammonium complex colorant, wherein the quaternary ammonium compound has a relatively low molecular weight, provides favorable non-migration and coloring characteristics within thermoplastics, thermosets, and waxes, as well as within ink-jet and printing applications and formulations. The removal of unwanted salts provides an improved stability for the complexes. Such a complex has excellent dispersability and solubility in plastics, water, organic solvents, and coating systems. Furthermore, the physical properties of the complex can be tailored to any particular requirement by altering the structure of the quaternary ammonium compound. For instance, a more hydrophobic quaternary ammonium structure affords the user, upon complexation with an anionic dye and removal of substantially all of the resultant salt, a colorant which is more soluble within organic solvents, waxes, and plastics, such as polyolefins, polyurethanes, and polyesters. Such inventive solid inorganic salt-free complexes can be dissolved in various solvents, diluents, and carrier systems. Such liquid solutions facilitate handling, processing, and manufacturing in a large-scale industrial setting.

Plastics, both thermoplastics and thermosets, are typically dyed by adding a pigment or dyestuff to the resins. The incorporation of pigments into plastics might adversely impact the physical properties of plastics. If a conventional dyestuff is employed, water resistance, oil resistance and the migration of the dyestuff may often be disadvantageously inadequate. One definite improvement in coloration of plastics is set forth in U.S. Pat. Nos. 4,640,690, to Baumgartner et al., and 4,507,407, to Kluger et al., in which liquid polymeric colorants are added to the resin before or during compounding and polymeric addition reaction. The polymeric colorants disclosed in these references may be broadly described as polyalkyleneoxy-substituted chromophore groups. Colorants of this general class are well known and have been disclosed as fugitive tints in U.S. Pat. No. 3,156,663 to Kuhn, as merely one example. Even though the polymeric colorant represents a vast improvement over prior arts, the actual number of chromophores which can be adapted to this technique is limited due to the lack of available polymeric intermediates.

The inventive complexes can be used for dyeing many different and diverse media, including thermoplastic composites, thermosets, and waxes, and can also be utilized within printing ink formulations, all as merely examples. The inventive complexes possess the advantageous properties of polymeric colorants such as high tint strength, desirable migratory properties, and minimal impact on the physical properties of plastics. Also, virtually all types and classes of chromophores can be adopted to practice this invention. A wide range of anionic dyes, such as acid dyes, direct dyes and certain food dyes, are useful within the inventive salt-free complexes. Such chromophore molecules, however, preferably have at least one reactive site (such as a sulfonic or carboxylic acid functionality) in order to form the necessary complex with the quaternary ammonium compound. The cationic ammonium group bonds with such acid (i.e., sulfonic and/or carboxylic) groups through ionic bonds. It is not fully understood how the interaction between the cationic moiety of the quaternary ammonium and the anionic moieties of the anionic dyes is accomplished; however, as discussed above, it is evident that the quaternary ammonium compound has a greater affinity for the anionic dye rather than for the anionic counter ion to which such quats are generally bonded. The same holds true for the anionic dye which has more of an affinity for the cationic quat rather than for the cationic counter ion. Upon complexation, then, the free counter ions of both components react together to form the aforementioned unwanted salts which require removal (at least to a substantial extent) from the resultant complex in order to provide the desired aforementioned beneficial properties. The permissible level of remaining salt, and thus the definition of substantially salt-free for this invention, within the inventive complex is, at most, about 5,000 ppm. In theory, it is impossible to remove all of the unwanted salt from such complexes; however, at such low, permissible, and attainable levels of salt content, the desired migration and colorant characteristics may be obtained. Certainly, a level of no salt at all would be most preferred, although such a level is, as noted above, nearly impossible to achieve.

A wide range of quaternary ammonium compounds have been shown to be useful for practicing the invention. A broad list of potentially useful quats within this invention include trialkyl, dialkyl, dialkoxy alkyl, monoalkoxy, mono-substituted polyalkoxy alkyl, di-substituted polyalkoxy alkyl, tri-substituted polyalkoxy alkyl, benzyl, and imidazolinium quatenary ammonium compounds. The particularly preferred quats are noted below as this is merely a broad list of different classes of quaternary ammonium compounds which may be useful within the inventive complex and method.

DESCRIPTION OF THE PREFERRED EMBODIMENT

Without limiting the scope of the invention, the preferred features of the invention are exemplified below. Chromophores containing at least one sulfonic acid or carboxylic acid functionality are preferred and are most suitable within this invention. The acid functionality may be directly coupled to the chromophore or to a substituent on the chromophore. Examples of suitable chromophores are acid dyes and direct dyes. By ways of example, and not limitation, a list of preferred dyes is set forth in TABLE 1 below:

TABLE 1

| Dye | Class | C.I. number |
| --- | --- | --- |
| Acid yellow 11 | Azo | 18820 |
| Acid yellow 17 | Azo | 42650 |
| Acid yellow 23 | Azo | 19140 |
| Acid yellow 25 | Azo | 18835 |
| Acid yellow 40 | Azo | 18950 |
| Acid yellow 3 | Quinoline | 47005 |
| Direct yellow 4 | Disazo | 24890 |
| Direct yellow 11 | Stilbene | 40000 |
| Direct yellow 44 | Disazo | 29000 |
| Acid orange 7 | Azo | 17925 |
| Acid orange 24 | Disazo | 20170 |

TABLE 1-continued

| Dye | Class | C.I. number |
| --- | --- | --- |
| Direct orange 15 | Stilbene | 40002 |
| Direct orange 39 | Stilbene | 40215 |
| Acid violet 7 | Azo | 18055 |
| Acid violet 19 | Triphenylmethane | 42685 |
| Acid violet 47 | Anthraquinone | * |
| Direct Violet 9 | Disazo | 27885 |
| Acid red 1 | Azo | 18050 |
| Acid red 4 | Azo | 14710 |
| Acid red 52 | Xanthene | 45100 |
| Acid red 87 | Xanthene | 45380 |
| Acid blue 127 | Anthraquinone | 62055 |
| Acid blue 9 | Triphenylmethane | 42090 |
| Acid black 1 | Disazo | 20470 |
| Acid black 2 | Azine | 50420 |
| Direct blue 86 | Phthalocyanine | 74180 |
| Direct blue 80 | Trisazo | 34200 |
| Direct blue 199 | Phthalocyanine | * |
| Direct black 22 | Polyazo | 35435 |
| Direct black 80 | Trisazo | 31600 |

*There are no Colour Index Numbers for these dyes.

Various types of quaternary ammonium compounds can be adapted to the invention herein with success. The quaternary ammonium compounds are analogs of ammonium salts in which organic radicals have been substituted for all four hydrogens of the original ammonium cation. Substituents may be alkyl, aryl, aralkyl, or alkoxylate groups, or the nitrogen may be part of a ring system. By ways of example, and not limitation, a list of preferred classes and examples of quaternary ammonium compounds is set forth in TABLE 2 below:

TABLE 2

| Class | Example (description) |
| --- | --- |
| Trialkyl quats | Methyl tri(hydrogenated tallow) ammonium chloride |
| Dialkyl quats | Dicoco dimethyl ammonium chloride |
| Dialkoxy alkyl quats | Methyl bis(polyethoxyethanol) coco ammonium chloride |
| Monoalkoxy quats | Methyl(polypropylene glycol) diethyl ammonium chloride |
| Benzyl quats | Dimethyl tallow benzyl ammonium chloride |
| imidazolinium quats | Methyl tallow amido-2-tallow imidazolinium methylsulfate |

Again, the examples listed above are merely preferred compounds; any such compound which has an average molecular weight of below about 900 and produces a solid compound upon complexation with an anionic dye is encompassed within the scope of this invention. The amount of residual inorganic salts is generally between about 50 ppb and 5000 ppm. Typically sodium counter-ions, and thus sodium salts, are the residual inorganic ions and salts within such anionic dyes. Monitoring of the inorganic salt level is available through conveniently and easily performed measurements of the sodium ion level within the composition.

Various purification techniques may be performed in order to remove substantially all of the residual inorganic salts from the complexes. Such techniques include, but are not limited to, solvent extraction, phase separation, and filtration methods. Ultrafiltration does not work very well to remove the unwanted salts since the colorants are solids and most of the inventive colorant complexes are not very soluble in water. Particularly preferred are phase separation through the utilization of an ammonium carbonate rinsing procedure (i.e., three consecutive washings with 25% aqueous ammonium carbonate in a 1:1 weight ratio to complex), and solvent extraction filtration through the utilization of methylene chloride. Furthermore, and alternatively, if the resultant purified solid colorant complex is water-insoluble, a simple wash with water can be performed in order to remove the water-soluble excess inorganic salts. After the removal of excess inorganic salt, the resultant solution should also be stripped of excess water in order to purify the colorant complex. The inventive complexes will always form a solid upon purification, particularly at ambient temperature and pressure.

The invention may be further understood by reference to the following non-limiting EXAMPLEs of the preferred embodiments of this invention.

Production of the Inventive Complex

EXAMPLE 1

8.9 g of Acid Yellow 23 were dissolved in 100 ml water with stirring. To this solution was added 17.56 g of dicoco dimethyl ammonium chloride (0.683 mol, available from Sherex under the trade name Adogen® 462). This composition was then stirred at 70° C. for one hour. Upon cessation of stirring, the solution formed two distinct layers which were then separated. The dark blue layer was water-insoluble and thus a simple rinsing with additional water permitted removal of the excess water-soluble inorganic salts. The resultant product was then stripped of residual water under vacuum and a bright yellow wax colorant was produced.

EXAMPLE 2

11.8 g of Direct blue 86 were dissolved in 100 ml water. To the solution was added 15.04 g of Adogen® 470 (ditallow dimethyl ammonium chloride). This composition was then stirred at 50° C. for 1 hour. The mixture was then subjected to methylene chloride extraction twice. The two methylene chloride solutions were then combined and stripped under vacuum to produce a dark cyan wax colorant. 30 mL of sorbitan monooleate surfactant (available from ICI under the trade name Span™ 80) was then added to the wax colorant and this solution was stirred at 80° C. for one hour to subsequently produce a cyan liquid.

EXAMPLE 3

10.0 g of Acid Red 1 were dissolved in 150 mL of water with stirring and heated to 50° C. To this stirred composition was added a mixture of 20.3 g of Adogen® 462 (75% active) and the mixture was subsequently heated to 70° C. and stirred for another 30 minutes. Upon standing, the mixture separated into two distinct layers. The aqueous layer containing the dissolved excess unwanted cation/counter-ion salt was discarded and the remaining product layer was evaporated to dryness to produce a dark red, stiff, waxy, non-flowable colorant.

EXAMPLE 4

Basically the same colorant of EXAMPLE 3 was formed except that a diluent was added during complex formation, thus producing a diluted liquid colorant complex. 11.4 g of Acid Red 1 were dissolved in 200 ml of water with stirring and heated to 50° C. To this stirred composition was added a mixture of 23.0 grams of Adogen® 462 and 67.0 grams of Span® 80 (surfactant). This mixture was then stirred at 50° C. for 30 minutes. Upon cessation of stirring, the mixture formed two distinct layers. The aqueous layer was discarded and the dark red organic layer was washed with additional water and removed of any excess salts through methylene chloride extraction. The product was stripped of residual water by heating under vacuum to give a viscous red liquid. It is noted that the addition of the sorbitan monooleate within the initial complex facilitated the phase separation for purification. Such an addition of surfactant may be performed either in this initial reaction stage or after the complex has been formed. The subsequent addition permits the formation of an easily handled and processed liquid dispersion of the inventive solid colorant complex.

Applications of the Inventive Complex

EXAMPLE 5

The colorant of EXAMPLE 3 was added to 40 grams of molten votive candle wax and stirred at 90° for 30 minutes. The wax mixture was then poured into molds and allowed to solidify. This produced a dark red candle having uniform color throughout the entire product and having no tendency to migrate into the plastic overwrap in which such candles are commonly packaged.

EXAMPLE 6

One gram of the colorant produced in EXAMPLE 2 was added to 1000 g of Fina™ 7525 polypropylene random copolymer pellets. This mixture was then further mixed through a tumbling procedure for 20 minutes to ensure uniform colorant distribution over the surface of the pellets. The resultant colored pellets were then injection molded at 425° F. into 3 inch by 2 inch polypropylene (thermoplastic) plaques with bi-level thicknesses of 50 mils and 85 mils. The cyan dye/quat complex colorant was evenly distributed throughout the polypropylene plaques and no discoloration was observed.

While specific features of the invention have been described, it will be understood, of course, that the invention is not limited to any particular configuration or practice since modification may well be made and other embodiments of the principals of the invention will no doubt occur to those skilled in the art to which the invention pertains. Therefore, it is contemplated by the appended claims to cover any such modifications as incorporate the features of the invention within the true meaning, spirit, and scope of such claims.

What is claimed is:

1. A colorant complex comprising
   an anionic dye compound; and
   a quaternary ammonium compound;
   wherein the colorant complex has been purified to substantially remove all salts other than the anionic dye/quaternary ammonium complex;
   wherein the colorant complex produces color in the visible spectrum;
   wherein the quaternary ammonium compound has an average molecular weight of at most 900 and is selected from the group consisting of trialkyl quats, dialkyl quats, dialkoxyalkyl quats, monoalkoxy quats, benzyl quats imidazolinium quats and any mixtures thereof; and
   wherein, the colorant complex is a solid when present in its pure, undiluted state.

2. The colorant complex of claim 1 wherein
   the quaternary ammonium compound is selected from the group consisting of methyl tri(hydrogenated tallow)

ammonium chloride, dicoco dimethyl ammonium chloride, dimethyl tallow benzyl ammonium chloride, methyl tallow amido-2-tallow imidazolinium methylsulfate, and any mixtures thereof.

3. The colorant complex of claim 1 wherein
the anionic dye compound is selected from the group consisting essentially of acid dyes, direct dyes, food dyes, and any mixtures thereof.

4. The colorant complex of claim 2 wherein
the anionic dye compound is an acid dye.

5. The colorant complex of claim 1 wherein
the quaternary ammonium compound has an average molecular weight of at most 650.

6. The colorant complex of claim 5 wherein
the quaternary ammonium compound has an average molecular weight of at most 400.

7. The colorant complex of claim 6 wherein
the quaternary ammonium compound has an average molecular weight of at most 200.

8. A colorant composition comprising
the colorant complex of claim 1; and
at least one solvent.

9. A colored thermoplastic composite comprising
the colorant complex of claim 1.

10. The thermoplastic composite of claim 9 wherein
said thermoplastic is selected from the group consisting of at least one polyolefin, at least one polyurethane, at least one polyester, and any mixtures thereof.

11. The thermoplastic composite of claim 10 wherein
said thermoplastic is at least one polyolefin.

12. The thermoplastic composite of claim 11 wherein
said polyolefin is selected from the group consisting of polypropylene, polyethylene, and any mixtures thereof.

13. A wax composition comprising
the colorant complex of claim 1; and
at least one wax other than the colorant complex of claim 1.

14. An ink composition comprising
the colorant complex of claim 1; and
at least one diluent, solvent, or carrier.

15. A method of producing the solid colorant complex of claim 1 comprising
 (a) reacting an anionic dye compound and a quaternary ammonium compound together in a reaction vessel; and
 (b) removing substantially all of the residual salt formed during the reaction in step "a".

16. The method of claim 13 wherein
step "b" entails a filtration procedure.

17. The method of claim 13 wherein
step "b" entails an extraction procedure.

18. The method of claim 13 wherein
step "b" is a phase separation procedure.

* * * * *

UNITED STATES PATENT AND TRADEMARK OFFICE
CERTIFICATE OF CORRECTION

| | | |
|---|---|---|
| PATENT NO. | : 5,938,828 | Page 1 of 1 |
| APPLICATION NO. | : 09/065620 | |
| DATED | : August 17, 1999 | |
| INVENTOR(S) | : Xiaodong Edward Zhao, Kaye Cannon Suddeth and Robert L. Mahaffey, Jr. | |

It is certified that error appears in the above-identified patent and that said Letters Patent is hereby corrected as shown below:

Column 9, line 7, after the word "consisting" delete --essentially--.

Signed and Sealed this

Eleventh Day of September, 2007

JON W. DUDAS
*Director of the United States Patent and Trademark Office*